MAGNETIC ELEMENT AND MEMORY

Filed Jan. 11, 1963 2 Sheets-Sheet 1

INVENTORS
ROBERT F. ELFANT
NICHOLAS J. MAZZEO
BY Frank Chadurjian
ATTORNEY

United States Patent Office 3,271,748

Patented Sept. 6, 1966

3,271,748

MAGNETIC ELEMENT AND MEMORY

Robert F. Elfant, Yorktown Heights, and Nicholas J. Mazzeo, Peekskill, N.Y., assignors to International Business Machines Corporation, New York, N.Y., a corporation of New York Filed Jan. 11, 1963, Ser. No. 250,908
19 Claims. (Cl. 340—174)

Figure 1A:
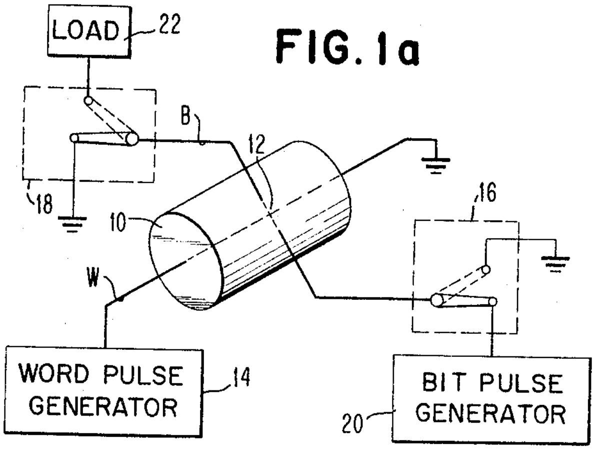

This invention relates to magnetic storage devices and their implementation in memory arrays, but more specifically is directed to an improved method of and means for magnetically storing information in a magnetic memory.

High-speed computers have become considerably faster and larger in the last few years. Despite the increase in complexity of these computers, there remain large numbers of problems which are possible to solve only with great difficulty. The major reason for this difficulty, in many cases, is the limited random access memory of the computing system.

With computers reaching an ultimate limitation in size and complexity, more and more effort is currently being expended in the area of large, random access, high density memories in order to enhance the capability of computing systems. To this end, increased effort is now proceeding in the basic sciences and many techniques have been suggested and discussed as set forth in the Proceedings of the Symposium on "Large Capacity Memory Techniques for Computing Systems," May 23–25, 1961, and provided in book form by MacMillan Company as edited by M. C. Yovits.

Some present limitations on the capacity of a random access magnetic memories are attributable to the characteristics of the core array, the switching mode employed, and the cost. In most random access magnetic memories heretofore suggested, magnetic storage cells have been aligned in columns and rows with coordinate address column and row conductors coupling all storage cells in the respective columns and rows. Each magnetic storage cell is usually made up of one or more magnetic elements made of material exhibiting a substantially rectangular hysteresis loop and information is stored by establishing a cell quantitively in different stable states of remanent flux density. For example, where a single magnetic core is employed as the storage cell, information is defined by establishing the core in one or an opposite limiting state of flux remanence and orientation. Thus, there is always a reversal of flux experienced in the core due to differences in flux density and, in most instances, this reversal causes a reversal in flux orientation, or polarity.

Magnetic memories as heretofore suggesed suffer many disadvanages from an operational standpoint when consideration is given to employ such techniques for large capacity storage. In such memories, it is a requirement that each of the drivers for each coordinate selection line provide bipolar current pulses of limited magnitude. Each of these pulses must have a sufficiently fast rise time regardless of the voltage which it is to supply. To provide proper operation, each magnetic element or elements defining the storage cell must exhibit a substantially rectangular hysteresis excitation characteristic with respect to each drive field applied thereto by the coordinate addresses. This imposes strict requirements on the material employed for each element and, hence, increased fabrication costs.

With the above requirements and disadvantages in view, it has become apparent that while the static magnetic qualities associated with such magnetic core memories have many desirable features, a radical departure from existing techniques for storing information in such memories is required to meet the needs of large capacity storage. By constructing a memory device according to this invention, many of the past problems are alleviated, if not eliminated.

A basic memory device according to the teachings of this invention comprises a first conductor and a second conductor spaced from, and in orthogonal relationship with respect to, one another. Magnetic material exhibiting different stable states of flux density and orientation is provided surrounding both the first and second conductors. The magnetic material is normally circumferentially magnetized with respect to the first conductor in a datum stable state of remanent flux orientation and distribution. The second conductor being at a right angle with respect to the first conductor, the second conductor is not coupled by the remanent flux in the datum stable state of remanent flux orientation and distribution. Whenever the first conductor is energized, it always applies a positive circumferential first field to saturate the material in the datum direction of remanent flux orientation. Whenever the second conductor is energized, a second field is applied to the magnetic material directed transverse with respect to the direction of the saturating first field. The datum remanent flux orientation of the magnetic material is employed to represent a first binary value and when it is desired to store a second binary value, the second conductor is energized concurrently with the energization of the first conductor. Energization of the first and second conductors is controlled to provide sequential concurrence so that the first and second fields are sequentially terminated in the order named. It has been found that the magnetic material is responsive to the concurrent application of the first and second fields, which are orthogonal with respect to one another, to be established in a similar circumferential state of remanent flux orientation with respect to the first conductor, but a different stable state of remanent flux distribution with respect to the datum state. With the magnetic material in the datum state of remanent flux orientation and distribution, there is no flux linkage of the second conductor. In order to provide flux linkage of the second conductor, a reversal of flux is not necessary, only a difference in distribution, hence this is in effect the action provided. The second conductor or another conductor similarly provided in the material is later utilized in an output circuit when the device is read out by again energizing the first conductor to establish the magnetic material in the datum stable state of circumferential remanent flux orientation and distribution with respect to the first conductor.

It may be seen that by utilizing the device as described above in a word organized memory, each coordinate drive line need only be energized by unipolar pulses. Since the device never traverses a hysteresis loop, the impedance level and, hence, the voltage required to provide the necessary drive currents is relaxed by orders of magnitude. Further, what is even more significant, since the first winding only provides a saturating field to the material in the original direction of remanent flux orientation, the only requirement with respect to the material is that it exhibit appreciable remanence as opposed to the requirement of providing rectangular loop material in prior art magnetic memory devices. This latter advantage considerably relaxes fabrication requirements and hence cost. The necessity that the material exhibit remanence is dictated by the fact that different stable states of remanent flux distribution is required to attain successful storage.

Accordingly, it is a prime object of this invention to provide an improved magnetic memory device.

Another object of this invention is to provide an improved magnetic memory for large capacity storage.

Still another object of this invention is to provide an improved magnetic memory for large capacity storage having less stringent requirements in the characteristics of the magnetic material, therefore, minimizing mass production problems and substantially reducing fabrication costs.

Yet another object of this invention is to provide an improved magnetic memory for large capacity storage having high production yield for mass fabrication and in which only unipolar pulses are required for each drive line further reducing engineering cost factors.

Another object of this invention is to provide an improved magnetic memory requiring only that the magnetic material of each storage position exhibit different states of remanent flux orientation.

The foregoing and other objects, features, and advantages of the invention will be apparent from the following more particular description of preferred embodiments of the invention, as illustrated in the accompanying drawings.

Figure 1B:
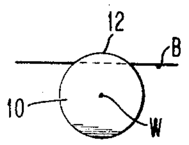

In the drawings:

FIGS. 1*a* and 1*b* are schematic illustrations of a memory device according to one embodiment of this invention.

Figure 2A:
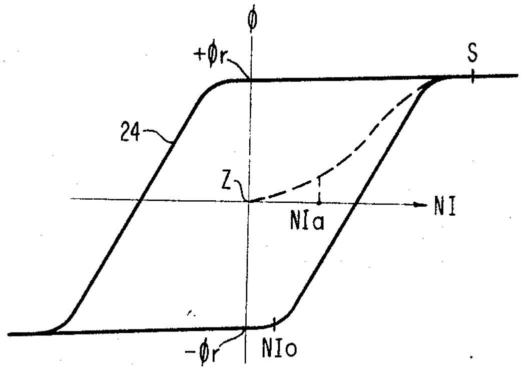
Figure 2B:
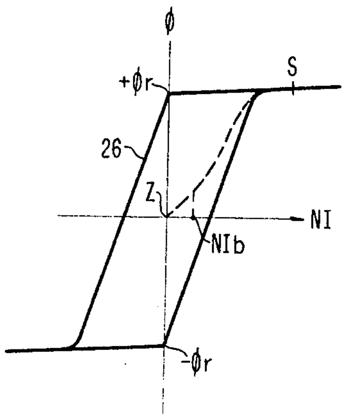

FIGS. 2*a* and 2*b* illustrate a plot of flux $\phi$ versus applied field NI) for different magnetic materials which may be employed in the device of FIGS.1*a* and 1*b*.

Figure 3:
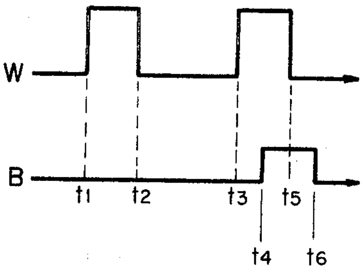

FIG. 3 is an illustration of a pulse program employed to operate the device of FIGS. 1*a* and 1*b*.

Figure 4A:
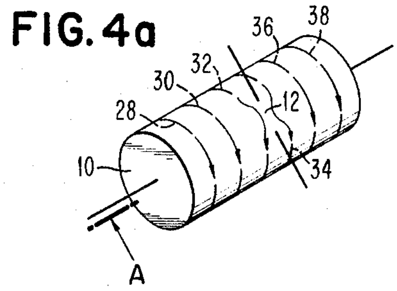
Figure 4B:
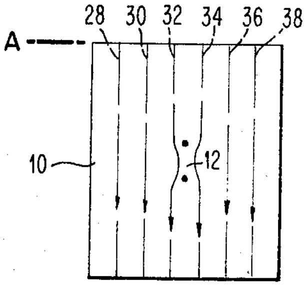

FIGS. 4*a* and 4*b* of the device of FIGS. 1*a* and 1*b* are a normal and a developed view, respectively, illustrating a datum stable state of remanent flux orientation and distribution.

Figure 5A:
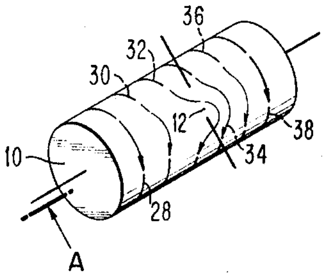
Figure 5B:
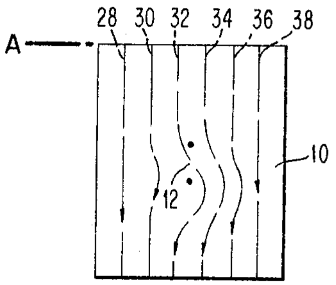

FIGS. 5*a* and 5*b* are a duplication of FIGS. 4*a* and 4*b*, respectively, illustrating a similar stable state of flux orientation but a different remanent state of flux distribution, with respect to the datum stable state, obtained in the operation of the device of FIG. 1*a*.

Figure 6:
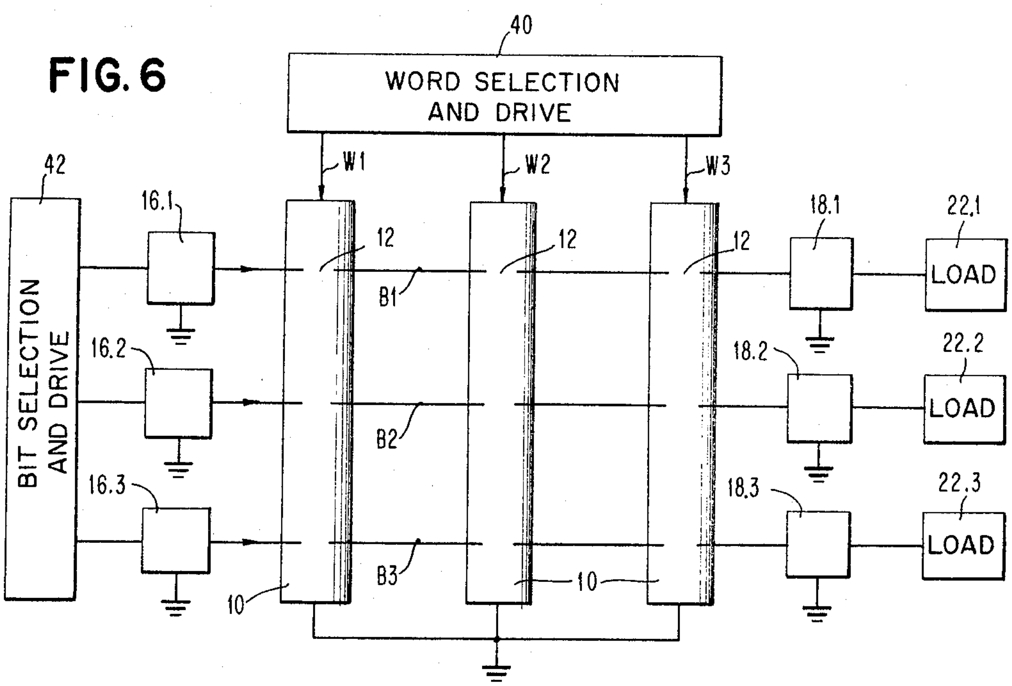

FIG. 6 is a magnetic memory according to another embodiment of this invention.

With reference to FIGS. 1*a* and 1*b*, a schematic illustration of one embodiment of this invention is shown which comprises a first conductor W and a second conductor B displaced from and in orthogonal relationship with respect to one another. Magnetic material in the form of a member 10 is provided surrounding both the conductors W and B. The magnetic material may take a cylindrical form as shown, but other forms such as tubular, block, and bar are also adaptable for use. The first and second conductors, W and B, may be separated from one another in ranging degrees; however, at least one conductor W should be located within the member 10 so that, when energized, it will magnetically influence at least a portion 12 of the member 10 coupled by the second conductor B. The first conductor W has one end connected to ground and the other end connected to a word pulse generator means 14. The second conductor B has one end connected to a switching means 16 and the other end connected to a similar switching means 18. The switching means 16 is operative to connect the conductor B either to ground or a bit pulse generator means 20, while the switching means 18 is operative to connect the conductor B to ground or a load 22. In operation, the switching means 16 and 18 are interconnected such that during a write cycle for the device the switch 16 connects the conductor B to generator 20 and the switch 18 connects the conductor B to ground; while during a read cycle for the device, the switch 18 connects the load 22 to conductor B and the switch 16 connects the conductor B to ground.

In practice, the material of member 10 may be made of any type of magnetic material including material exhibiting the well-known rectangular loop characteristic since the only restriction which is imposed on the material is that when made entirely of the same type material it exhibits different stable states of flux remanence.

Since most magnetic material exhibits some remanence, even the so-called transformer-type magnetic material, any magnetic material is sufficient. Referring to FIGS. 2*a* and 2*b*, curves 24 and 26, respectively, illustrate a plot of flux ($\phi$) versus applied field (NI) for different types of magnetic material which provide satisfactory operation of the device of FIG. 1*a*. The hysteresis loops defined by the curves 24 and 26 are 60-cycle hysteresis loops obtained by alternately saturating the material of member 10 circumferentially with respect to the conductor W, by applied magnetic fields and obtaining a trace on an oscilloscope connected to a standard integrating circuit and a conductor having a similar relationship to the material of member 10 as the conductor W. Since the conductor B is in a right-angle relationship with conductor W, the conductor B cannot be utilized to obtain the traces for curves 24 and 26.

Referring to curve 24 illustrated in FIG. 2*a*, the hysteresis illustrated differs from that exhibited by the so-called "rectangular loop" material. That is, in the prior art magnetic material exhibiting a "rectangular loop" characteristic is taken to mean that the hysteresis curve exhibits opposite stable states of remanent flux orientation and density; a well-defined switching threshold which must be exceeded before any flux switching can take place; and, more important, that with a field applied which is equal in magnitude to twice the magnitude of the field defined by the switching threshold of the material a complete reversal in magnetization takes place so that a core is switching from one stable remanent state on its major hysteresis loop to the opposite stable remanent state. This imposes the ideal requirement that the sides of the hysteresis loop have a slope which is as close to infinite as possible, i.e., vertical, and that the saturation flux density be as close to the remanence flux density as is possible, i.e., a $\phi r/\phi s$ of 0.9 or greater.

Referring to hysteresis curve 24 illustrated in FIG. 2*a*, the curve defines opposite remanent states $-\phi r$ and $+\phi r$ with a defined switching threshold having a magnitude NI*o*. However, the slope of the sides of the hysteresis curve 24 is far from being infinite, i.e., substantially vertical with respect to the bottom and top. In fact, application of a field which is twice the magnitude of the switching threshold NI*o* is insufficient to cause a saturation or complete reversal of flux from $-\phi r$ to $+\phi r$. Referring to the hysteresis curve 26 illustrated in FIG. 2*b*, although the material exhibits different remanent states, $-\phi r$ and $+\phi r$, there is no defined switching threshold nor does application of twice the field necessary to overcome any switching threshold which may be found to cause complete reversal of the magnetization from one stable remanence state to another.

In order to explain the operation of the device of FIG. 1*a*, reference will be made to a pulse program illustrated in FIG. 3 in which various time intervals ($t1$–$t6$) will be referred to, and wherein the pulses applied to the conductor W by pulse generator 20 are labelled with respect to the conductor W as is the energization of conductor B by the generator 26.

Assume, initially, that the material of member 10 of FIG 1*a* is in a datum stable state of circumferential remanent flux orientation and distribution with respect to conductor W. This datum state may be considered as the positive remanence condition $+\phi r$ on either curve 24 or 26 shown in FIG. 2*a* or 2*b*, respectively. In order to clearly indicate the remanent flux orientation of the device, reference is made to FIGS. 4*a* and 4*b*. The remanent flux orientation and distribution defining the initial or datum stable state is illustrated in FIGS. 4*a* and 4*b* wherein remanent flux lines 28–38 of given polarity illustrate a given remanent flux orientation and distribution of flux within the material of member 10. Particular note is made of the fact that with respect to the portion 12 of the member 10 there is no remanent flux traversing the portion 12 to encircle and magnetically link the conductor B due to the concentric magnetization of the member with respect to the conductor W.

As with most memory devices before information is written, the device is first cleared or read out and thereafter new information stored. Accordingly, to effect a readout of the device of FIG. 1*a*, the conductor W is energized at ($t1$) by the generator 14 to apply a field to the member 10 in a direction similar to the direction defined by the positive remanent flux orientation illustrated in FIG. 4*a*. The magnitude of this field is sufficient to saturate the member 10 to a point up to and beyond a point S of positive saturation as labelled on the respective curves 24 and 26 of FIGS. 2*a* and 2*b*. This field will hereinafter alternately be referred to as the saturating word field or simply the word field. Upon collapse of the word field at time ($t2$), the member 10 returns to positive remanence $+\phi r$ or the datum remanence flux orientation state of FIG. 4*a*. To effect storage of information, at time ($t3$), the conductor W is again energized by the generator 14 to again provide a positive saturating word field to the member 10. With nothing more, upon termination of this field, the member 10 is again established in the datum stable remanence state as illustrated in FIGS. 4*a* and 4*b*, representing a stored binary 0. However, to store a binary 1, the generator 20 is operatively connected to the conductor B at time ($t4$) and applies a current pulse thereto. Energization of conductor B causes a field to be applied to the portion 12 of the member 10 which is directed transverse with respect to the positive saturating word field applied by the energized conductor W. The field created by energization of the conductor B will hereinafter alternately be referred to as the transverse bit field or simply bit field. The generator 14 then terminates energization of the conductor W at time ($t5$) and thereafter, at time ($t6$), the generator 20 terminates energization of the conductor B. Upon termination of the transverse bit field to the member 10 at time ($t6$), the member is established in a different stable state of flux distribution as is shown in FIGS. 5*a* and 5*b*.

Referring to FIGS. 5*a* and 5*b*, it will be seen that although the polarity and, hence, orientation of the remanent flux is similar to the polarity and orientation of the remanent flux illustrated in FIGS. 4*a* and 4*b*, the distribution of remanent flux differs. In FIGS. 4*a* and 4*b*, there is no remanent flux which links the conductor B while in FIGS. 5*a* and 5*b*, due to the difference in flux distribution, some flux is caused to link the conductor B. Therefore, when the member 10 is thereafter read out, the positive saturating word field applied by energization of the conductor W alone, similar to the operation described with reference to time interval ($t1$–$t2$), the member 10 is re-established in the datum distribution stable state of FIGS. 4*a* and 4*b*. This causes the flux previously linking the winding B in FIGS. 5*a* and 5*b* to traverse the conductor B and thereby induce a voltage therein indicative of the flux traversal. Since the switching means 16 and 18 are conditioned to connect the conductor B to ground and load 22 during the interval ($t1$–$t2$), this induced voltage is utilized to signify a stored binary 1.

Particular reference is again made to the structure of FIG. 1*a* and its operation. It should be noted that not only does this structure allow advantages with respect to the use of magnetic materials and novel switching modes, but a minimum amount of induced noise is provided due to the quadrature arrangement of the conductors W and B. In practice, however, due to the dfficulty of providing an exact quadrature arrangement and/or geometry, a slight noise signal is sensed for a stored binary 0. However, signal-to-noise ratios in excess of two and five to one have been demonstrated. During readout ($t1$–$t2$), with member 10 in a stored binary 0 condition, since there is no remanent flux linkage of the conductor B no voltage is induced in conductor B. Thus, the noise signal usually accompanying magnetic storage devices of the prior art during readout is eliminated. With respect to the transverse bit field applied to the member 10, and, more particularly to the portion 12 by the energized bit conductor B ($t4$–$t6$), the magnitude of this field must be controlled so that in the absence of the saturating word field, an erroneous remanent flux orientation is not created about the conductor B. Although creation of an erroneous remanent flux orientation about the conductor B does not cause a flux distribution similar to the stored binary 1 of FIG 4*b*, there will be a voltage induced in the conductor B of a polarity indicative of a stored binary 1 when the member 10 is read out. Accordingly, with respect to the bit field, there is some switching threshold which must not be exceeded.

Considering curves 24 and 26 of FIGS. 2*a* and 2*b*, respectively, it would seem that since the bit field must not exceed a given switching threshold, the material exhibiting at least a curve 24 of FIG. 2*a* must be employed as compared with the curve 26 of FIG. 2*b* since the curve exhibits a given switching threshold NI*o* while the curve 26 does not. This, however, is not the case, since both type materials work well. In order to provide an explanation of why materials exhibiting a hysteresis such as illustrated by curves 24 and 26 of FIGS. 2*a* and 2*b*, respectively, attention is directed to the portion 12 of member 10. Consider the magnetization of portion 12 when the member 10 is in the datum remanent state of flux orientation and distribution illustrated in FIG. 4*a*. Since the portion 12 exhibits no defined state of remanent flux orientation in the datum stable state, the magnetic domains are randomly oriented and the portion 12 is at zero magnetization defined by a labelled point Z in both plots of FIGS. 2*a* and 2*b*. With the portion 12 at zero magnetization Z, there exists a given switching threshold for an applied field when the material of the member exhibits any hysteresis including the hysteresis illustrated in FIGS. 2*a* and 2*b*. This switching threshold may be defined as a field magnitude of NI*a* in FIG. 2*a* and a field magnitude of NI*b* in FIG. 2*b*. In both instances, the magnitude of NI*a* and NI*b* is in excess of any switching threshold exhibited by the material on its major hysteresis loop as illustrated by curves 24 and 26 of FIGS. 2*a* and 2*b*, respectively.

The mechanism involved by which a difference in remanent flux distribution is achieved in the device of FIG. 1*a* is not completely understood; however, what is believed to take place is that with respect to the portion 12 of member 10, the magnetic domains being randomly oriented, are conditioned, by the saturating word field to be oriented in a direction similar to the direction of the applied word field. Application of the transverse bit field during the existence of the high saturating word field has little or no effect until time ($t5$) when the word field starts to collapse. During the period ($t5$–$t6$), the transverse bit field causes a majority of the domains to orient themselves in a given direction thereby establishing a magnetized state within the portion 12 and a flux distribution upon termination of the transverse bit field as is illustrated in FIG. 4*b*. To cause the randomly oriented domains in the portion 12 to orient themselves in alignment with saturating word field, the magnitude of the word field must be large enough to drive the member 10 into saturation. Since all that is required of the transverse bit field is to initiate a uniform direction of stability to the domains, its magnitude may be, relative to the magnitude of the word field, orders of magnitude smaller.

It follows then, from the above conditions, that since storage is manifested by a difference in remanent flux distribution, as opposed to a difference in remanent flux density or orientation, the only requirement on the material of member 10 is that it exhibits a flux remanence characteristic. Still further, since storage is achieved by a difference in remanent flux distribution traversing the portion 12 of member 10, the member 10 may be made of composite materials. For example, the portion 12 may be made of magnetic material exhibiting appreciable flux remanence while the remaining portions of the member 10 may be made of material exhibiting very little or no flux remanence, i.e., ideal transformer material. Alternately, the portion 12 may be made of material exhibiting little or no flux remanence, ideal transformer material, while the material of the remaining portions of the member 10 exhibits appreciable flux remanence. In the latter example, the remanent flux distribution for a stored binary 1 is maintained by the remanent bias provided to the portion 12 due to the remanent flux characteristic of the remaining material of the member.

Referring now to FIG. 6, a magnetic memory according to this invention is schematically illustrated. The memory is word organized having a plurality of column conductors W1–W3 and a plurality of bit row conductors B1–B3. Associated with and surrounding each word conductor W1–W3 is a magnetic member 10.1–10.3. Along the length of each member 10.1–10.3 each bit row conductor B is provided which couples a different portion of the material of the members 10.1–10.3 along its length. The word column conductors W have one end connected to ground while the other end is connected to a word address and drive means 40 capable of providing address selection of a particular word line W1–W3 and the pulse generation corresponding to word generator 14 of FIG. 1*a*. The bit row conductors B1–B3 are connected to a bit address and drive means 42 through a respecive switch 16.1–16.3 and are further connected to loads 22.1–22.3 through switches 18.1–18.3, respectively. The means 42 provides the function of bit addressing and pulse generating corresponding to the generator 20 of FIG. 1*a*. The bit row conductors B1–B3 are con- the switch 16 and each switch 18.1–18.3 corresponds to the switch 18 of FIG. 1*a*. During the write time of the memory cycle, a particular word line W1–W3 is energized and in partial concurrence therewith and in overlapping time sequence the bit row conductors B1–B3 are energized only when binary 1 is to be stored in a particular bit position. For those bit positions of members 10.1–10.3 in which the corresponding word conductor is not energized, there is no change in remanent flux distribution in the material of the member coupled by the bit conductors B which are energizing for storing a binary 1 in the particular storage position along a selected one of the members 10.1–10.3. For readout, a select conductor W1–W3 is energized by means 40 to apply a saturating word field to the particular member 10 while the switches 16 and 18 are conditioned to connect the loads 22 to the row conductors B.

While the storage device shown in FIG. 1*a* employs the conductor B as both an input conductor and output conductor by proper operation of the switches 16 and 18, it should be understood that, if desired, a further conductor may be employed similar to the conductor B in manifestation of the ouput signal thereby eliminating the necessity of the switches 16 and 18.

A comparison of the device here disclosed as utilized in a memory compared with other conventional magnetic storage elements is almost always necessary from a standpoint of voltage requirements of the drivers associated with the memory for cost and speed analysis. It is well known that in most prior art magnetic memories, each coordinate address is usually energized by impulses of opposite polarity. Generally speaking, this then requires approximately two drivers for each coordinate address line of the memory. In a conventional two-dimensional memory comprising a coordinate array of N columns and M rows, the number of drivers required is then $2(N+M)$. Consider, however, the number of drivers required for a two-dimensional memory constructed in accordance with the embodiment of FIG. 6 of this invention. Since only unipolar pulses are required, the number of drivers necessary is half that required for the above-mentioned conventional magnetic memories, i.e., $(N+M)$. The most striking advantage realized in the construction of a memory according to this invention is the fact that the back voltage required for driving the word line W having a large number of bit positions is very small since essentially the word driver encounters very little impedance. This is due to the fact that the material of member 10 is operated along saturation. This compares favorably with other prior art memories where the coordinate address lines apply fields to a core tending to switch flux, and where reversal of flux is required for successful storage of information causing large back voltages due to the changes in inductance and, hence, impedance. Thus, the memory of the invention is amenable to mass fabrication techniques where the conductors W and B are originated as a grid of conductors similar to a wire screen wherein a large number of bit positions for each word may be provided without imposing the severe restriction of high voltages on the drivers.

In order to aid in the understanding and practicing of the invention and starting at a place for one skilled in the art, a set of the specifications for one embodiment of FIG. 1*a* of this invention is given below. It should be understood that no limitation should be construed since other components may be employed with satisfactory operation.

With respect to the embodiment of FIG. 1*a*, each member 10 may be made of T–55 material of the type disclosed in U.S. Patent No. 2,950,252 assigned to the assignee of this application. The member 10 may have an inside diameter of 0.0616 inch and an outside diameter of 0.123 inch with an overall length of 0.95 inch. The word field applied to the member 10 during readout ($t1$–$t2$) and writing ($t2$–$t4$) may be approximately 3.0 ampere turns, hereinafter abbreviated as AT, and this field may be applied for approximately 0.42 microsecond. The magnetic field applied to the bit conductor B for writing ($t4$–$t6$) may be 0.080 AT for approximately one microsecond. The time difference between the application of the word field and application of the bit field defined by ($t4$)–($t3$) may be approximately 0.14 microsecond. Further, the memory of FIG. 6 may be mass fabricated by employing a process as disclosed in a copending application (IBM Docket 10,526), Serial No. 206,326, filed June 29, 1962, in behalf of J. M. Brownlow et al., and assigned to the assignee of this application.

While the invention has been particularly shown and described with reference to preferred embodiments, it will be understood by those skilled in the art that the foregoing and other changes in form and details may be made therein without departing from the spirit and scope of the invention.

What is claimed is:

1. A magnetic memory comprising;

a grid of coordinately arranged conductors of a first and second group;

magnetic material exhibiting appreciable remanence surrounding the conductors of both said first and second groups at their cross-over junction and normally magnetized circumferentially with respect to the conductors of the first group in a datum state of remanent flux orientation and distribution providing no appreciable flux linkage of the conductors of said first group;

first selection and drive means;

utilization means;

switching means for operatively connecting all the conductors of the second group to said first selection and drive means during one time interval in the operation of said memory and for operatively connecting all the conductors of said second group to said utilization means during another time interval in the operation of said memory;

second selection and drive means operatively connected to all the conductors of said first group during both said one and another time intervals in the operation of said memory for energizing a selected one of the conductors of said first group to apply a first field to and saturate the material surrounding the selected conductor of the first group in the datum state of flux orientation;

said first selection and drive means selectively operative during the one time interval in the operation of said memory for energizing at least one conductor of said second group to apply a second field, to the magnetic material surrounding the conductor of said second group, which is directed transverse with respect to the saturating field applied by the energized conductor of said first group, and which is of a magnitude insufficient to cause an appreciable change in the datum remanent flux orientation and distribution of the material surrounding the conductor of said second group;

said magnetic material being responsive to the conjoint application of said saturating first field and said transverse second field to be established in a remanent state of similar flux orientation but of different distribution providing an appreciable flux linkage of the conductor of said second group.

2. A magnetic core memory comprising;

a grid of coordinately arranged conductors of a first and second group;

magnetic material exhibiting appreciable remanence surrounding the conductors of both said first and second groups at their cross-over junction and normally magnetized circumferentially with respect to the conductors of the first groups in a datum state of remanent flux orientation and distribution with no appreciable flux linkage of the conductors of said second group;

first selection and drive means operatively connected to all the conductors of said first group during a first and a second time interval in the operation of said memory for energizing a selected one of the conductors of said first group to apply a first field to, and saturate the material surrounding the selected conductor of the first group in the datum state of flux orientation;

second selection and drive means selectively operative to energize at least one conductor of said second group only during the second time interval in the operation of said memory for applying a second field to the magnetic material surrounding the energized conductor to said second group which field is directed transverse with respect to the saturating first field and which is of a magnitude insufficient to cause an appreciable change in the remanent datum flux orientation and distribution of the material surrounding the conductor of said second group;

said magnetic material being responsive to the conjoint application of said saturating first field and said transverse second field to be established in a remanent state of similar datum flux orientation but of different distribution relative to said datum distribution whereby an appreciable remanent flux linkage of said energized conductor of said second group is thereafter established.

3. The memory of claim 2, wherein the conductors of said first group couple all the magnetic material at the cross-over junction and the conductors of said second group couple a portion of the material at the cross-over junction.

4. The memory of claim 3, wherein the magnetic material is continuous along each of the conductors of said first group.

5. The memory of claim 2, wherein said first and second selection and drive means are conjointly operative during said second time interval and sequentially disconnected in the order named.

6. A magnetic information storage device comprising;

a first electrical conductor, a second electrical conductor spaced from and in orthogonal relationship to said first conductor;

a magnetic member, made of material exhibiting stable states of flux remanence, surrounding both said first and second conductors and normally magnetized circumferentially with respect to said first conductor in a datum state of remanent flux orientation and distribution with no appreciable flux linkage of said second conductor to represent a first information value;

first means operative to energize said first conductor to apply a first field to said member and saturate said member in said datum flux orientation state;

second means operative to energize said second conductor to apply a second field to said member, directed transverse with respect to said first field, which is of insufficient magnitude to cause an appreciable change in the datum remanent flux orientation and distribution of said member;

said member being responsive to the operation of said first and second means in sequential concurrence to be established in a similar datum state of flux orientation but a different remanent state of flux distribution relative to said datum state of flux distribution whereby a remanent flux linkage of said second conductor is thereafter established to represent a second information value.

7. A magnetic information storage device comprising a first conductor;

a second conductor displaced from and in orthogonal relationship with said first conductor;

a magnetic member surrounding said first and second conductors, said member made of material exhibiting different stable states of flux remanence and normally magnetized circumferentially with respect to said first conductor in a datum stable state of remanent flux orientation and distribution with no appreciable remanent flux linkage of said second conductor, said first conductor adapted to apply a first field to said member capable of saturating said member in said datum state of remanent flux orientation, when energized;

said second conductor adapted to apply a second field to said member directed transverse with respect to the datum remanent flux of insufficient magnitude to cause an appreciable change in the datum remanent flux orientation and distribution when energized; and, means for energizing both said first and second conductors in sequential concurrence to establish said member in a similar stable state of flux orientation but a different remanent state of flux distribution with respect to said datum stable state whereby an appreciable remanent flux linkage of said second conductor is established.

8. A magnetic information storage device comprising;

a first conductor;

a second conductor displaced from and in orthogonal relationship with said first conductor;

a magnetic member surrounding said first and second conductors, said member made of material exhibiting different stable states of flux remanence and normally magnetized circumferentially with respect to said first conductor in a datum stable state of remanent flux orientation and distribution with no appreciable remanent flux linkage of said second conductor; and, means for energizing both said first and second conductors in sequential concurrence to establish said member in a similar stable state of flux orientation but a different remanent state of flux distribution with respect to said datum stable state whereby an appreciable remanent flux linkage of said second conductor is thereafter established.

9. A magnetic information storage device comprising;
a first conductor;
a second conductor removed from and in orthogonal relationship to said first conductor forming a cross-over junction;
a magnetic member made of material exhibiting different stable remanent flux states surrounding said first and second conductors at their cross-over junction, said member normally magnetized in a datum state of remanent flux orientation and distribution such that there is no remanent flux linkage of said second conductor;
means for energizing said first and second conductors in sequential concurrence to establish said member in a similar orientation state but a different remanent flux distribution state and cause remanent flux linkage of said second conductor.

10. A magnetic information storage device comprising;
a magnetic member made of material exhibiting different stable states of flux remanence, and being normally magnetized in a datum stable state of flux orientation and distribution representing a first information value;
a first conductor coupling all the material of said member and adapted, when energized, to saturate said member in said state of datum flux orientation;
a second conductor coupling a portion of the material of said member and adapted, when energized, to apply a field directed transverse to the datum flux orientation of said member and having a magnitude which is insufficient to cause an appreciable change in the datum flux orientation and distribution of said member; and,
means for energizing said first and second conductor in sequential concurrence to establish said member in a similar state of datum flux orientation but a different remanent state of flux distribution with respect to said datum state to represent a second information value.

11. A magnetic information storage device comprising;
a magnetic member made of material exhibiting different stable states of flux remanence and normally magnetized in a datum state of remanent flux orientation and distribution to represent a first information value;
first means operative to pass a first current through said member for applying a first field thereto of a magnitude and direction to saturate said member in a said datum orientation state;
second means operative to pass a second current through a portion of said member directed transverse with respect to said first current for applying a second field directed transverse with respect to said first field and which is of insufficient magnitude to cause an appreciable change in the datum state of remanent flux orientation and distribution, and,
third means for operating said first and second means in sequential concurrence to establish said member in a similar datum state of flux orientation but a different remanent state of flux distribution relative to said datum state of flux distribution to represent a second information value.

12. A magnetic information storage device comprising:
a first conductor;
a second conductor displaced from and in orthogonal relationship with said first conductor;
a magnetic member surrounding said first and second conductors, said member made of material exhibiting different stable states of flux remanence and normally magnetized circumferentially with respect to said first conductor in a datum stable state of remanent flux orientation and distribution with no appreciable flux linkage of said second conductor;
said first conductor adapted to apply a field to said member at right angles to the axis of said first conductor and parallel to the axis of said second conductor to saturate said member in and thereby establish said datum remanent stable state, when energized;
said second conductor adapted to apply a field to said member at right angles to the axis of said second conductor and parallel to the axis of said first conductor which is insufficient to cause an appreciable change in the datum stable state of said member, when energized, and
means for energizing said first and second conductors in sequential concurrence to establish said member in a similar state of flux orientation but a different remanent state of flux distribution with respect to said datum stable state and thereby establish a remanent flux linkage of said second conductor.

13. A magnetic memory comprising:
a plurality of separated and parallel word conductors,
magnetic material exhibiting different stable states of flux remanence surrounding each said word conductor and normally magnetized circumferentially with respect to said word conductor in a datum stable state of remanent flux orientation and distribution,
a plurality of parallel bit conductors embedded in said material extending in orthogonal relationship to and in close proximity with different portions of all said word conductors,
first means for energizing a selected word conductor to apply a field to said material at right angles to the axis of said word conductor and parallel to the axis of said bit conductors to establish the material surrounding said selected word conductor in a datum stable state of remanent flux orientation and distribution such that there is no appreciable remanent magnetic flux linkage of said bit conductors;
second means for selectively energizing at least one of said bit conductors in sequential concurrence with said selected word conductor to apply a field to said material at right angles to the axis of said bit conductor and parallel to the axis of said word conductors, which is insufficient, of andby itself, to cause an appreciable change in the datum stable state of remanent flux orientation and distribution of said material, and is operable in sequential concurrence with the field applied by said energized word conductor to establish the material common to both said energized word and bit conductors in a similar state of remanent flux orientation but a different remanent state of flux orientation with respect to said datum state whereby an appreciable remanent magnetic flux linkage of said energized bit conductor is thereafter established.

14. A magnetic memory comprising:
a plurality of separated and paralle word conductors;
magnetic material exhibiting different stable states of flux remanence surrounding each said word conductor and normally magnetized circumferentially with respect to each said word conductor in a datum stable state of remanent flux orientation and distribution;
a plurality of parallel bit conductors embedded in said material extending in orthogonal relationship to and in close proximity with different portions of all said word conductors;
first selection and drive means;
utilization means;
switching means for operatively connecting all the bit conductors to said first selection and drive means during one time interval in the operation of said memory and for operatively connecting all said bit conductors to said utilization means during another time interval in the operation of said memory;
said first selection and drive means selectively operative during the one time interval in the operation of said memory for energizing at least one bit conductor to apply a first field to said material at right angles to the axis of said bit conductor and parallel to the axis of all said word conductors, which is insufficient to cause an appreciable change in the datum stable state of said material;

second selection and drive means operatively connected to all said word conductors during both said one and another time intervals in the operation of said memory to apply a second field directed at right angles to the axis of said word conductor and parallel to the axis of all said bit conductors and saturate said material in said datum stable state;

said material common to and responsive to the application of both said first and second fields during the one time interval in the operation of said memory to be established in a similar state of flux orientation but a different stable remanent state of flux distribution with respect to said datum stable state.

15. A magnetic memory comprising:

a plurality of separated and parallel word conductors;

a plurality of separated and parallel bit conductors in orthogonal relationship, and forming cross-over junctions, with said plurality of word conductors;

magnetic material exhibiting at least one stable state of flux remanence and a demagnetized stable state surrounding such said word and bit conductor at their cross-over junctions, said material being normally in a demagnetized stable state with respect to said but conductors;

first selection and drive means;

utilization means;

switching means for operatively connecting all said bit conductors to said first selection and drive means during a first time interval in the operation of said memory and for operatively connecting all said bit conductors to said utilization means during a second time interval in the operation of said memory;

said first selection and drive means selectively operative during the first time interval in the operation of said memory for energizing at least one bit conductor to apply a first field to said material at angles to the axis of the bit conductor and parallel to the axis of all said word conductors which is insufficient to cause an appreciable change in the demagnetized state of said material with respect to said one bit conductor;

second selection and drive means selectively operative during first and second intervals in the operation of said memory for energizing a selective one of said word conductors to apply a second field directed at right angles to the axis of said word conductor and parallel to the axis of said bit conductors and of a magnitude sufficient to saturate said material surrounding said one word conductor in said datum stable state;

said material common to said one energized word conductor and at least said energized bit conductor being responsive to the applicaiton of said first and second fields during said first time interval in the operation of said memory to thereafter be established in said one stable state of flux remanence with respect to said energized bit conductors.

16. A magnetic memory comprising;

a plurality of separated and parallel word conductors;

a plurality of separated and parallel bit conductors in orthogonal relationship, and forming cross-over junctions, with said plurality of word conductors;

magnetic material exhibiting at least one stable state of flux remanence and a demagnetized stable state surrounding each said word and bit conductor at their cross-over junctions and normally in a demagnetized state with respect to said bit conductors;

first selection and drive means;

utilization means;

switching means for operatively connecting all said bit conductors to said first selection and drive means during a first time interval in the operation of said memory and for operatively connecting all said bit conductors to said utilization means during a second time interval in the operation of said memory;

said first selection and drive means operative during the first time interval in the operation of said memory for energizing at least one of said bit conductors and apply a first field to all the material common thereto at the cross-over junctions which is insufficient to cause an appreciable change in the demagnetized state;

second selection and drive means operatively connected to all said word conductors and operative during both the first and second time interval in the operation of said memory for energizing a selected one of said word conductors directed transverse to said bit conductors and of sufficient magnitude to saturate said material common to said selected word conductor in a direction transverse to said bit conductor such that said material is left in the demagnetized state with respect to said bit conductors;

said material common to both said energized word conductor and said energized bit conductor during said first interval of time responsive to said first and second applied fields to thereafter be established in said one stable remanence state with respect to said energized bit conduction.

17. An information storage device comprising;

energized bit conduction.

a second electrical conductor separated from and in orthogonal relationship with said first conductor;

a magnetic member surrounding both said first and second conductors, said magnetic member made of material exhibiting at least one stable state of flux remanence and a demagnetized state and normally in said demagnetized state with respect to said first conductor and thereby represent a first information value;

said first conductor adapted, when energized, to apply a field to said member parallel to the axis of said second conductor which is insufficient to cause a change in the demagnetized state thereof, said second conductor adapted, when energized, to apply a field to said member directed parallel to the axis of said first conductor to saturate said member in a direction parallel to the axis of said first conductor and thereby cause no change in the demagnetized state of said member with respect to said first conductor; and, means for energizing said first and second conductors in sequential concurrence to establish said member in said one stable state of flux remanence with respect to said first conductor and thereby represent a second information value.

18. An information storage device comprising;

an electrical conductor;

a magnetic member surrounding said conductor, said magnetic member made of material exhibiting at least one stable state of remanent flux and a demagnetized state and normally in said demagnetized state with respect to said conductor to represent a first information value, first means operatively connected to said conductor for energizing said conductor to apply a first field to said member which is insufficient to cause an appreciable change in the demagnetized state;

second means coupled to said member and operative to apply a second field to said member directed transverse to said first field to saturate said member in said demagnetized state; and means for operating said first and second means in sequential concurrence to establish said member in said one stable state of remanent flux with respect to said conductor and thereby represent a second information value.

19. An information storage device comprising;

a first electrical conductor;

a member made of magnetic material exhibiting at least one stable state of flux remanence and a demagnetized stable stable surrounding said conductor, said member normally in said demagnetized state with respect to said conductor to represent a first information value;

a second electrical conductor embedded in said member separated from and in orthogonal relationship to said first conductor adapted, when energized, to apply a field to said member directed parallel to the axis of said first conductor and of sufficient magnitude to saturate said member in a direction parallel to the axis of said first conductor;

said first conductor adapted, when energized, to apply a field to said member directed parallel to the axis of said second conductor of insufficient magnitude to cause an appreciable change in the demagnetized state; and means for energizing said first and second conductors in sequential concurrence to establish said member in said one stable remanent state with respect to said first conductor to thereby represent a second information value.

No references cited.

BERNARD KONICK, *Primary Examiner.*

G. LIEBERSTEIN, *Assistant Examiner.*